(12) United States Patent
Shimomura

(10) Patent No.: US 6,992,807 B2
(45) Date of Patent: Jan. 31, 2006

(54) OPTICAL SCANNING APPARATUS AND IMAGE FORMING APPARATUS USING THE SAME

(75) Inventor: Hidekazu Shimomura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 32 days.

(21) Appl. No.: 10/725,399

(22) Filed: Dec. 3, 2003

(65) Prior Publication Data

US 2004/0109212 A1    Jun. 10, 2004

(30) Foreign Application Priority Data

Dec. 3, 2002    (JP)    ............................ 2002-350682

(51) Int. Cl.
  *G02B 26/08*    (2006.01)
  *B41J 27/00*    (2006.01)
(52) U.S. Cl. ...................... 359/207; 359/205; 359/216; 347/259; 347/232
(58) Field of Classification Search ........ 359/204–207, 359/216; 347/232, 243, 244, 258, 259
  See application file for complete search history.

(56) References Cited

U.S. PATENT DOCUMENTS

| 6,717,705 B2 * | 4/2004 | Takakubo .................... 359/207 |
| 2002/0126362 A1 | 9/2002 | Shimomura ................. 359/196 |
| 2003/0025784 A1 | 2/2003 | Sato et al. ................... 347/244 |
| 2003/0043442 A1 | 3/2003 | Ishihara et al. ............. 359/205 |
| 2003/0048352 A1 | 3/2003 | Kato et al. ................... 347/258 |
| 2003/0053815 A1 | 3/2003 | Testardi et al. ............... 399/79 |
| 2004/0027446 A1 | 2/2004 | Kato et al. ................... 347/228 |
| 2004/0090658 A1 * | 5/2004 | Takakubo |

* cited by examiner

*Primary Examiner*—James Phan
(74) *Attorney, Agent, or Firm*—Fitzpatrick, Cella, Harper & Scinto

(57) ABSTRACT

This invention provides an optical scanning apparatus in which the degree of sensitivity of the bending of a scanning line on a surface to be scanned resulting from the disposition error of a scanning optical system is reduced, whereby good images can always be obtained, and an image forming apparatus using the same.

The optical scanning apparatus has deflecting means for deflecting a beam emitted from light source means, and a scanning optical system having a plurality of scanning lenses for directing the beam onto the surface to be scanned, and a first scanning lens La is such that the shape thereof in a main scanning cross section is a meniscus shape having positive refractive power, and satisfies the condition that d1/fm<0.06, where fm is the focal length of the scanning optical system in the main scanning cross section, and d1 is the central thickness of the first scanning lens, and a second scanning lens is such that. in the main scanning cross section, the shape of the light incidence side surface thereof is an aspherical free of an inflection point or arcuate shape, and satisfies the condition that 2.5<|R3/fm|, where R3 is the radius of curvature of the light incidence side surface on an optical axis in the main scanning cross section.

13 Claims, 12 Drawing Sheets

OPTICAL SCANNING APPARATUS AND IMAGE FORMING APPARATUS USING THE SAME

BACKGROUND OF THE INVENTION

1. Field of the Invention

This invention relates to an optical scanning apparatus and an image forming apparatus using the same, and particularly is suitable for an image forming apparatus such as a laser beam printer, a digital copying machine or a multi-function printer having an electrophotographic process which is designed to cause a beam emitted from light source means to be reflected and deflected by a polygon mirror as a light deflector, and optically scan a surface to be scanned through a scanning optical system to thereby record image information. Also, the present invention relates to a color image forming apparatus using a plurality of optical scanning apparatuses and comprising a plurality of image bearing members corresponding to respective colors.

2. Related Background Art

Heretofore in the optical scanning apparatus of a laser beam printer or the like, a beam optically modulated in conformity with an image signal and emitted from light source means has been periodically deflected by a light deflector comprising, for example, a rotary polygon mirror, and has been converged into a spot shape on the surface of a photosensitive recording medium (photosensitive drum) by a scanning optical system (fθ lens system) having an fθ characteristic, and has been optically scanned on the surface of the recording medium to thereby effect image recording.

FIG. 13 of the accompanying drawings is a schematic view of the essential portions of a conventional optical scanning apparatus. In FIG. 13, a divergent beam emitted from light source means 91 is made into a substantially parallel beam or a convergent beam by a collimator lens 92, and this beam (quantity of light) is shaped by an aperture stop 93 and enters a cylindrical lens 94 having refractive power only in a sub-scanning direction. Of the beam which has entered the cylindrical lens 94, a part in a main scanning cross section emerges in its intact state, and a part in a sub-scanning cross section converges and is formed as a substantially linear image near the deflecting surface 95a of a light deflector 95 comprising a rotary polygon mirror.

The beam reflected and deflected by the deflecting surface 95a of the light deflector 95 is then directed onto the surface of a photosensitive drum as a surface 98 to be scanned through a scanning optical system (scanning lens) 96 having an fθ characteristic, and the light deflector 95 is rotated in the direction of arrow A to thereby optically scan in the direction of arrow B (main scanning direction) on the surface 98 of the photosensitive drum and effect the recording of image information.

To effect the highly accurate recording of image information in such an optical apparatus, it is necessary that curvature of image field be well corrected over the entire surface to be scanned, that there be a distortion characteristic (fθ characteristic) accompanied by uniformity of speed between an angle of view θ and an image height Y, and that the spot diameter on the surface to be scanned be uniform at each image height. There have heretofore been proposed various optical scanning apparatus or scanning optical systems satisfying such optical characteristics.

Particularly in the case of a color image forming apparatus in which a laser beam is directed from an optical scanning apparatus to four photosensitive members (photosensitive drums) to thereby form latent images thereon, and the images of originals of respective colors, i.e., Y (yellow), M (magenta), C (cyan) and Bk (black) are formed on the surfaces of the respective corresponding photosensitive members, the images of four colors, i.e., Y, M, C and Bk, formed on the surfaces of the respective photosensitive members are superposed on a transferring material such as paper and therefore, if curvature occurs to the scanning line of the optical scanning apparatus corresponding to each photosensitive member, there will arise the problem that an error occurs to the shape of a scanning line among the four colors and color misregister occurs in the images on the transferring material and this results in the remarkable deterioration of image performance.

Several causes of the occurrence of the bending of the scanning line are conceivable, and among them, qualitative description will be made below about a case where the scanning lens is inclinedly mounted.

FIG. 14 of the accompanying drawings is a perspective view of essential portions when a flat glass plate 121 is inclined in the scanning optical system (when it is rotated about an axis orthogonal to the optical axis of the scanning lens and the rotary shaft of the light deflector), FIG. 15 of the accompanying drawings is a cross-sectional view of the essential portions in the main scanning direction in FIG. 14 (main scanning cross-sectional view), and FIG. 16 of the accompanying drawings is a cross-sectional view of the essential portions in the sub-scanning direction in FIG. 14 (sub-scanning cross-sectional view).

When here, the thickness of the flat glass plate 121 is defined as L, and the refractive index of the material thereof is defined as n, and the angle of inclination of the flat glass plate is defined as θ, and the angle of incidence of an off-axis ray Bi in the main scanning direction is defined as ϕ, an on-axis ray Ai is bent downwardly in the sub-scanning direction by a surface 120, whereafter it emerges in parallelism to an incident light Ai while being shifted by a distance ΔZ1 in the sub-scanning direction. Likewise, the outermost off-axis ray Bi also emerges while being shifted by a distance ΔZ2 in the sub-scanning direction. Assuming here that there is nothing between the flat glass plate 121 and a surface 122 to be scanned, the bending ΔZ of the scanning line on the surface 122 to be scanned is:

$\Delta Z1 \approx L \cdot \sin(\theta - a\sin(\sin\theta/n))$ $\Delta Z2 \approx L \cdot \sin(\theta - a\sin(\sin\theta/n))/[\cos(a\sin(\sin\phi/n))]$ $\Delta Z \approx \Delta Z2 - \Delta Z1 = L \cdot \sin(\theta - a\sin(\sin\theta/n) \cdot [(1/\cos(a\sin(\sin\phi/n))]$. (Expression A)

Actually, the scanning lens is of a shape curved in the main scanning direction and has power also in the sub-scanning direction and therefore requires a detailed analysis, but when an optical part constituting the scanning optical system is mounted while being rotated about the axis orthogonal to the optical axis of the scanning lens and the rotary shaft of the light deflector, there arises the problem that the bending of the scanning line occurs on the surface to be scanned.

SUMMARY OF THE INVENTION

The present invention has as an object thereof to provide an optical scanning apparatus in which the degree of sensitivity of the bending of a scanning line on a surface to be scanned resulting from the disposition error of a scanning optical system is reduced, whereby good images can always be obtained, and an image forming apparatus using the same.

The present invention has as a further object thereof to provide a color image forming apparatus in which there can be obtained a good color image free of color misregister.

The optical scanning apparatus of the present invention is an optical scanning apparatus provided with light source means, deflecting means for deflecting a beam emitted from the light source means, and a scanning optical system having a plurality of scanning lenses for directing the beam deflected by the deflecting means onto a surface to be scanned, wherein of the plurality of scanning lenses, a first scanning lens nearest to the deflecting means is such that the shape thereof in a main scanning cross section is a meniscus shape having positive refractive power, and satisfies the condition that $$d1/fm<0.06,$$

where fm is the focal length of the scanning optical system in the main scanning cross section, and d1 is the central thickness of the first scanning lens, and a second scanning lens nearest to the surface to be scanned is such that in the main scanning cross section, the shape of the light incidence side surface thereof is an aspherical shape free of an inflection point or an arcuate shape, and satisfies the condition that $$2.5<|R3/fm|,$$

where R3 is the radius of curvature of the light incidence side surface on an optical axis thereof in the main scanning cross section.

Further features of the present invention will become apparent from the accompanying drawings and the following description.

DESCRIPTION OF THE PREFERRED EMBODIMENTS (First Embodiment)

Figure 1:
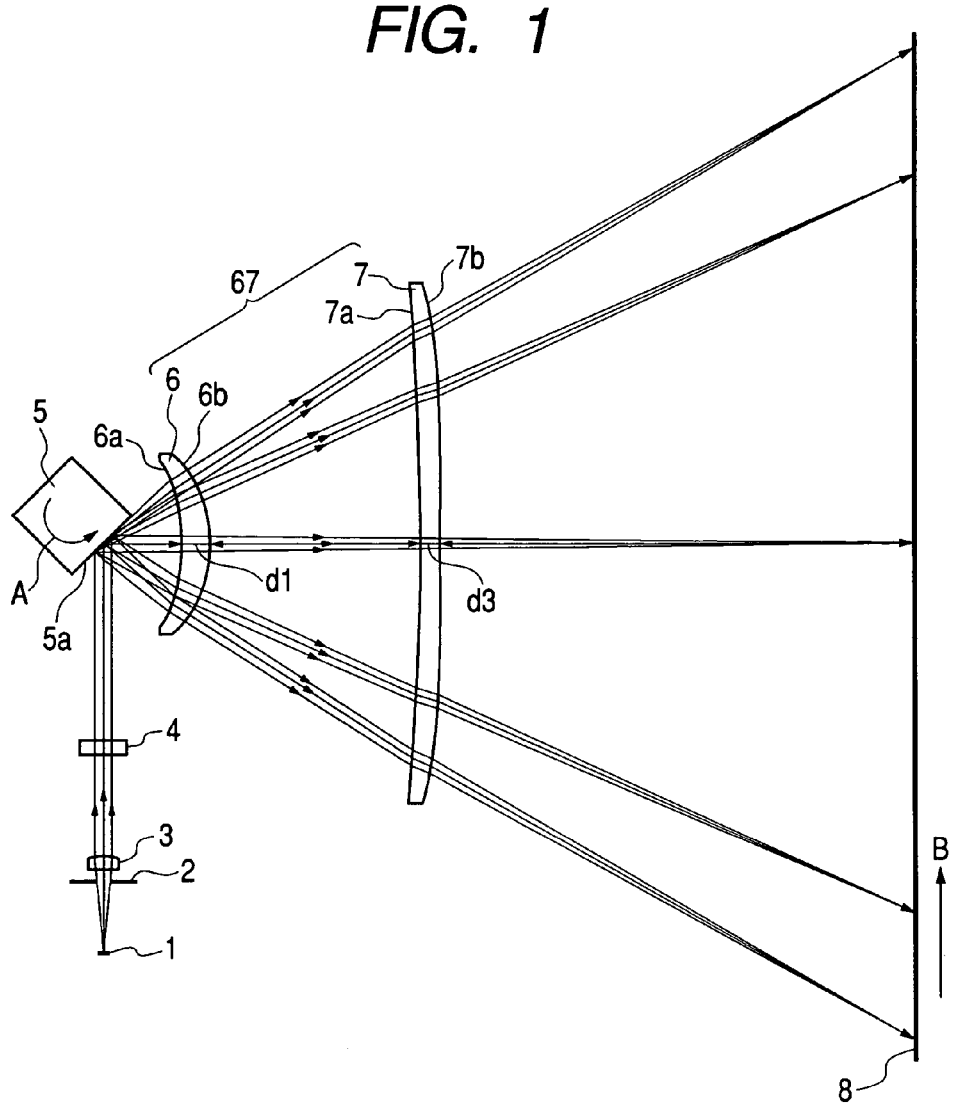
FIG. 1 is a main scanning cross-sectional view of a first embodiment of the present invention.
Figure 2:
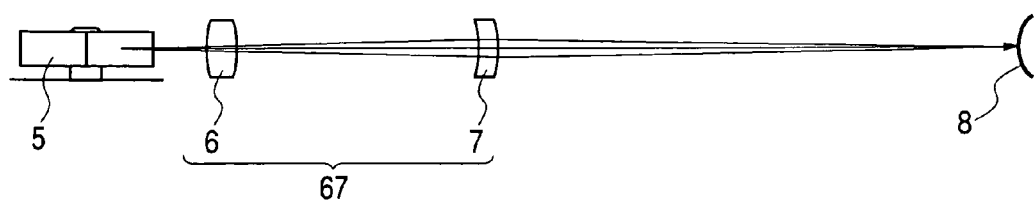
FIG. 2 is a sub-scanning cross-sectional view of the first embodiment of the present invention.

FIG. 1 is a cross-sectional view (main scanning cross-sectional view) of the essential portions of a first embodiment of the optical scanning apparatus of the present invention in a main scanning direction, and FIG. 2 is a cross-sectional view (sub-scanning cross-sectional view) of the essential portions of the first embodiment of the optical scanning apparatus of the present invention in a sub-scanning direction.

Here, the main scanning direction refers to a direction perpendicular to the rotary shaft of deflecting means and the optical axis of a scanning optical element (a direction in which a beam is reflected and deflected (deflected and scanned) by the deflecting means), and the sub-scanning direction refers to a direction parallel to the rotary shaft of the deflecting means. Also, the main scanning cross section refers to a plane parallel to the main scanning direction and containing the optical axis of a scanning optical system. Also, the sub-scanning cross section refers to a cross section perpendicular to the main scanning cross section.

In FIGS. 1 and 2, the reference numeral 1 designates light source means having a light-emitting point, and it comprises, for example, a semiconductor laser. The light source means may be comprised of a semiconductor laser array having a plurality of light-emitting points. The reference numeral 2 denotes an aperture stop which limits a beam passing therethrough and shapes the shape of the beam. The reference numeral 3 designates a condensing lens (collimator lens) which converts a beam emitted from the light source means 1 into a substantially parallel beam (or a substantially divergent beam or a substantially convergent beam). The reference numeral 4 denotes an optical system (cylindrical lens) having predetermined power only in the sub-scanning direction, and it causes the beam passed through the collimator lens 3 to be imaged as a substantially linear image on the deflecting surface (reflecting surface) 5a of a light deflectors which will be described later in the sub-scanning cross section. The aperture stop 2, the collimator lens 3 and the cylindrical lens 4 constitutes the elements of an incidence optical system.

The reference numeral 5 designates a light deflector as deflecting means, and it comprises, for example, a four-side polygon mirror (rotary polygon mirror) and is rotated in the direction of arrow A in FIG. 1 at a constant speed by drive means (not shown) such as a motor.

The reference numeral 67 denotes a scanning optical system (fθ lens system) having a condensing function and an fθ characteristic, and having first and second scanning lenses (fθ lenses) 6 and 7 formed of a plastic material.

The first scanning lens 6 nearest to the light deflector 5 is such that the shape thereof in the main scanning cross section is a meniscus shape having positive refractive power, and in the sub-scanning cross section, the two surfaces thereof are of a convex shape.

The second scanning lens 7 nearest to a surface 8 to be scanned is such that in the main scanning cross section, the shape of the light incidence side surface thereof is an aspherical free of an inflection point or arcuate shape, and in the sun-scanning cross section, it is a meniscus shape having its concave surface facing the light deflector 5 side and having positive refractive power.

The scanning optical system 67 causes a beam based on image information and reflected and deflected by the light deflector 5 to be imaged on the surface 8 of a photosensitive drum as the surface to be scanned, and makes the deflecting surface 5a of the light deflector 5 and the surface 8 of the photosensitive drum conjugate with each other in the sub-scanning cross section, thereby having an inclination correcting function.

In the present embodiment, the beam emitted from the semiconductor laser 1 has its quantity of light limited by the aperture stop 2, is converted into a substantially parallel beam by the collimator lens 3, and enters the cylindrical lens 4. Of the substantially parallel beam which has entered the cylindrical lens 4, a part in the main scanning cross section emerges in its intact state. Also, a part in the sub-scanning cross section converges and is imaged as a substantially linear image (a linear image long in the main scanning direction) on the deflecting surface 5a of the light deflector 5. The beam reflected and deflected by the deflecting surface 5a of the light deflector 5 is then imaged in a spot shape on the surface 8 of the photosensitive drum through the first scanning lens 6 and the second scanning lens 7, and optically scans on the surface 8 of the photosensitive drum at a uniform speed in the direction of arrow B (the main scanning direction) by the light deflector 5 being rotated in the direction of arrow A. Thereby, image recording is effected on the surface 8 of the photosensitive drum as a recording medium.

The optical arrangement and the surface shapes of the first scanning lens 6 and the second scanning lens 7 in the present embodiment are shown in Tables 1A, 1B and 1C below.

TABLE 1A (Embodiment)

Construction of Optical Scanning Apparatus
fθ coefficient, scanning width,
Angle of view

| | | |
|---|---|---|
| fθ coefficient | k (mm/rad) | 149.8 |
| scanning width | W (mm) | 214 |
| maximum angle of view | θ (deg) | 40.93 | wave length, refractive index

| | | |
|---|---|---|
| wavelength used | λ (nm) | 780 |
| refractive index of fθ lens 6 | N1 | 1.5242 |
| refractive index of fθ lens 7 | N2 | 1.5242 | arrangement of scanning optical system

| | | |
|---|---|---|
| polygon deflecting surface 5a - lens incidence surface 6a | d0 (mm) | 16.50 |
| lens incidence surface 6a - lens exit surface 6b | d1 (mm) | 6.00 |
| lens exit surface 6b - lens incidence surface 7a | d2 (mm) | 45.50 |
| lens incidence surface 7a - lens exit surface 7b | d3 (mm) | 4.00 |
| lens exit surface 7b - surface 8 to be scanned | d4 (mm) | 100.85 |
| polygon deflecting surface 5a - surface 8 to be scanned | d total | 172.85 | angle of incidence
(incidence optical system)

| | | |
|---|---|---|
| Angle of incidence in main scanning direction | d (deg) | 90.00 |

TABLE 1B (Embodiment)
Construction of Optical Scanning Apparatus

| | meridian line shape of fθ lens 6 | | | sagittal line shape of fθ lens 6 | |
|---|---|---|---|---|---|
| | incidence surface 6a counter-light source side | exit surface 6b counter-light source side | | incidence surface 6a counter-light source side | exit surface 6b counter-light source side |
| R | −3.40747E+01 | −2.37094E+01 | Rs | 1.23654E+02 | −3.58307E+01 |
| K | −1.92449E+00 | −1.19254E+00 | D2 | −7.60545E−03 | 1.94009E−03 |
| B4 | 3.78594E−06 | −1.93521E−06 | D4 | 3.01563E−05 | −1.12093E−05 |
| B6 | 1.78412E−08 | 1.67602E−08 | D6 | −4.16484E−08 | 1.37295E−07 |
| B8 | −1.25017E−10 | −4.82288E−11 | D8 | 0.00000E+00 | −1.54542E−10 |
| B10 | 1.73294E−13 | 1.89382E−14 | D10 | 0.00000E+00 | 0.00000E+00 |
| | Light source side | Light source side | | Light source side | Light source side |
| R | −3.40747E+01 | −2.37094E+01 | Rs | 1.23654E+02 | −3.58307E+01 |
| K | −1.92449E+00 | −1.19254E+00 | D2 | −7.60545E−03 | 1.94009E−03 |
| B4 | 3.78594E−06 | −1.93521E−06 | D4 | 3.01563E−05 | −1.12093E−05 |
| B6 | 1.78412E−8 | 1.67602E−08 | D6 | −4.16484E−08 | 1.37295E−07 |
| B8 | −1.25017E−10 | −4.82288E−11 | D8 | 0.00000E+00 | −1.54542E−10 |
| B10 | 1.73294E−13 | 1.89382E−14 | D10 | 0.00000E+00 | 0.00000E+00 |

TABLE 1C (Embodiment)
Construction of Optical Scanning Apparatus

| | meridian line shape of fθ lens 7 | | | sagittal line shape of fθ lens 7 | |
|---|---|---|---|---|---|
| | incidence surface 7a counter-light source side | exit surface 7b counter-light source side | | incidence surface 7a counter-light source side | exit surface 7b counter-light source side |
| R | −6.000000E+02 | −4.50637E+02 | Rs | −7.60732E+01 | −1.82872E+01 |
| K | 0.000000E+00 | −1.57402E+01 | D2 | −1.03108E−04 | 1.49234E−04 |
| B4 | 0.000000E+00 | −1.36218E−06 | D4 | 1.61268E−08 | −9.34195E−04 |
| B6 | 0.000000E+00 | 3.59567 − 10 | D6 | 0.00000E+00 | 2.90104E−11 |
| B8 | 0.000000E+00 | −6.93125E−14 | D8 | 0.00000E+00 | −3.68440E−15 |
| B10 | 0.000000E+00 | 5.83160E−18 | D10 | 0.00000E+00 | 0.00000E+00 |
| | Light source side | Light source side | | Light source side | Light source side |
| R | 0.000000E+00 | 4.50637E+02 | Rs | −7.60732E+61 | −1.82872E+01 |
| K | 0.000000E+00 | 1.57402E+01 | D2 | −9.79758E−05 | 1.49234E−04 |
| B4 | 0.000000E+00 | −1.36218E−06 | D4 | 1.71428E−08 | −9.34195E−08 |
| B6 | 0.000000E+00 | 3.59567E−10 | D6 | 0.00000E+00 | 2.90104E−11 |
| B8 | 0.000000E+00 | −6.93125E−14 | D8 | 0.00000E+00 | −3.68440E−15 |
| B10 | 0.000000E+00 | 5.83160E−18 | D10 | 0.00000E+00 | 0.00000E+00 |

The meridian line shapes of the incidence surfaces and exit surfaces of the first scanning lens 6 and the second scanning lens 7 are constituted by aspherical shapes which can be expressed as functions up to the tenth order. For example, when the point of intersection between the first scanning lens 6 and the optical axis is defined as the origin and the direction of the optical axis is defined as the X-axis and an axis orthogonal to the optical axis in the main scanning cross section is defined as the Y-axis, the meridian line direction corresponding to the main scanning direction is expressed by the expression that $$X = \frac{\frac{Y^2}{R}}{1+\sqrt{1-(1+K)\left(\frac{Y}{R}\right)^2}} + B4 \times Y^4 + B6 \times Y^6 + B8 \times Y^8 + B10 \times Y^{10},$$

where R is the radius of curvature of the meridian line, and K, B4, B6, B8 and B10 are aspherical surface coefficients.

Also, the sagittal line direction corresponding to the sub-scanning direction is expressed by the expression that $$S = \frac{\frac{Z^2}{Rs^*}}{1+\sqrt{1-\left(\frac{Z}{Rs^*}\right)^2}}.$$

S is a sagittal line shape defined in a plane containing a normal to the meridian line at each position in the meridian line direction and perpendicular to the main scanning plane.

Here, the radius of curvature in the sub-scanning direction (the sagittal line radius of curvature) Rs* at a position distant by Y from the optical axis in the main scanning direction is expressed by the expression that $$Rs^* = Rs \times (1 + D2 \times Y^2 + D4 \times Y^4 + D6 \times Y^6 + D8 \times Y^8 + D10 Y^{10}),$$

where Rs is the sagittal line radius of curvature on the optical axis, and D2, D4, D6, D8 and D10 are sagittal line change coefficients.

While in the present embodiment, the surface shapes are defined by the above-mentioned mathematical expressions, the scope of the right of the present invention does not limit this.

As shown in Tables 1A, 1B and 1C, the incidence surface 6a of the first scanning lens 6 is such that the meridian line shape thereof is an aspherical shape (a non-arcuate shape and the sagittal line direction thereof is a saddle-shaped surface having convex (positive) power. Also, the exit surface 6b of the first scanning lens 6 is such that the meridian line shape thereof is an aspherical shape (a non-arcuate shape) and the sagittal line direction thereof is a barrel-shaped surface having convex power. The incidence surface 7a of the second scanning lens 7 is such that the meridian line shape thereof is an arcuate shape and the sagittal line direction thereof is a barrel-shaped surface having concave (negative) power. Also, the exit surface 7b of the second scanning lens 7 is such that the meridian line shape thereof is an aspherical shape which is a concave surface on the optical axis and has an inflection point at an intermediate image height, and the sagittal line direction thereof is a saddle-shaped surface (on the axis) having convex power.

As previously described, when the optical part constituting the scanning optical system 67 is mounted while being rotated about the axis orthogonal to the optical axis of the scanning lens and the rotary shaft of the light deflector 5, the bending of the scanning line occurs on the surface 8 to be scanned. In the case of a flat glass plate, as shown in the aforementioned expression (A), the bending of the scanning line can be suppressed by making the angle of inclination θ and the thickness L small. A similar tendency is also seen in a scanning lens curved in the main scanning direction.

So, in the present embodiment, the central thicknesses d1 and d3 of the first scanning lens 6 and the second scanning lens 7, respectively, are made small to the utmost to thereby reduce the degree of sensitivity of the bending of the scanning line by inclination eccentricity. Particularly, the first scanning lens 6 adjacent to the light deflector 5 is strong in the power in the main scanning direction, and is in a direction in which the thickness increases, but by optimizing the power distribution of the first scanning lens 6 and the second scanning lens 7, the disposition of the first scanning lens 6 and the second scanning lens 7, and the aspherical amount of each surface, there are achieved thin lens shapes in which d1=6 mm and d3=4 mm.

Here, when the focal length of the scanning optical system 67 in the main scanning cross section is defined as fm (mm) and the central thickness of the first scanning lens 6 is defined as d1 (mm), it is preferable to satisfy the condition that $$d1/fm<0.06 \tag{1}$$

By satisfying conditional expression (1), the degree of sensitivity of the bending of the scanning line by inclination eccentricity can be reduced. Incidentally, in the present embodiment, d1/fm=0.04, and this satisfies conditional expression (1).

More preferably, conditional expression (1) may be $$0.02<d1/fm<0.05. \tag{1a}$$

Still more preferably, the lower limit value may be 0.005.

Figure 3:
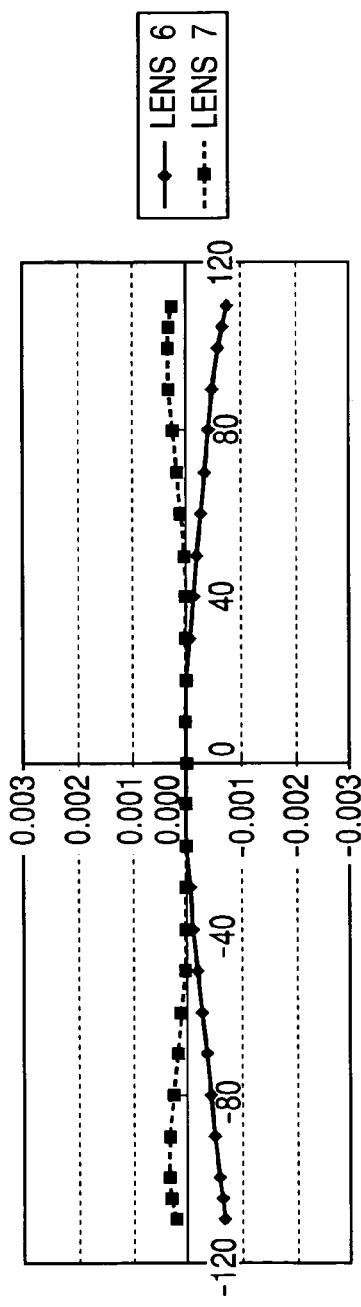
FIG. 3 shows the degree of sensitivity of the bending (inclination eccentricity) of a scanning line in the first embodiment of the present invention.

FIG. 3 shows the bending of the scanning line on the surface 8 to be scanned when the first scanning lens 6 and the second scanning lens 7 are disposed while being inclined by 3' about the axis orthogonal to the optical axis of the scanning optical system 67 and the rotary shaft of the light deflector 5. As shown in FIG. 3, it will be seen that in spite of the inclination by 3', the bending is suppressed to an amount of bending of 1 μm or less.

Figure 4:
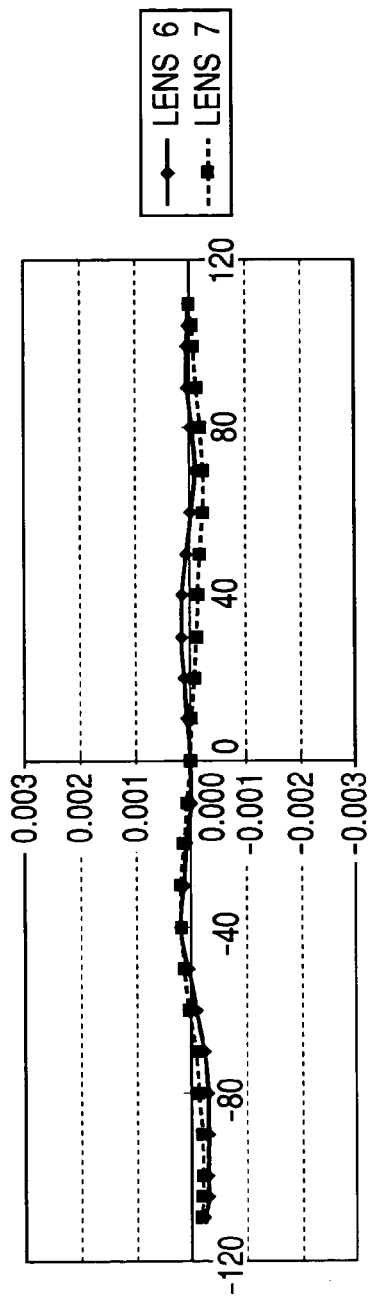
FIG. 4 shows the degree of sensitivity of the bending (parallel eccentricity) of the scanning line in the first embodiment of the present invention.

FIG. 4 shows the bending of the scanning line when the first scanning lens 6 and the second scanning lens 7 are parallel-shifted by 0.03 mm in the sub-scanning direction. Again in this case, it will be seen that as in the above-described case, the bending is suppressed to the amount of bending of 1 μm or less.

Figure 5:
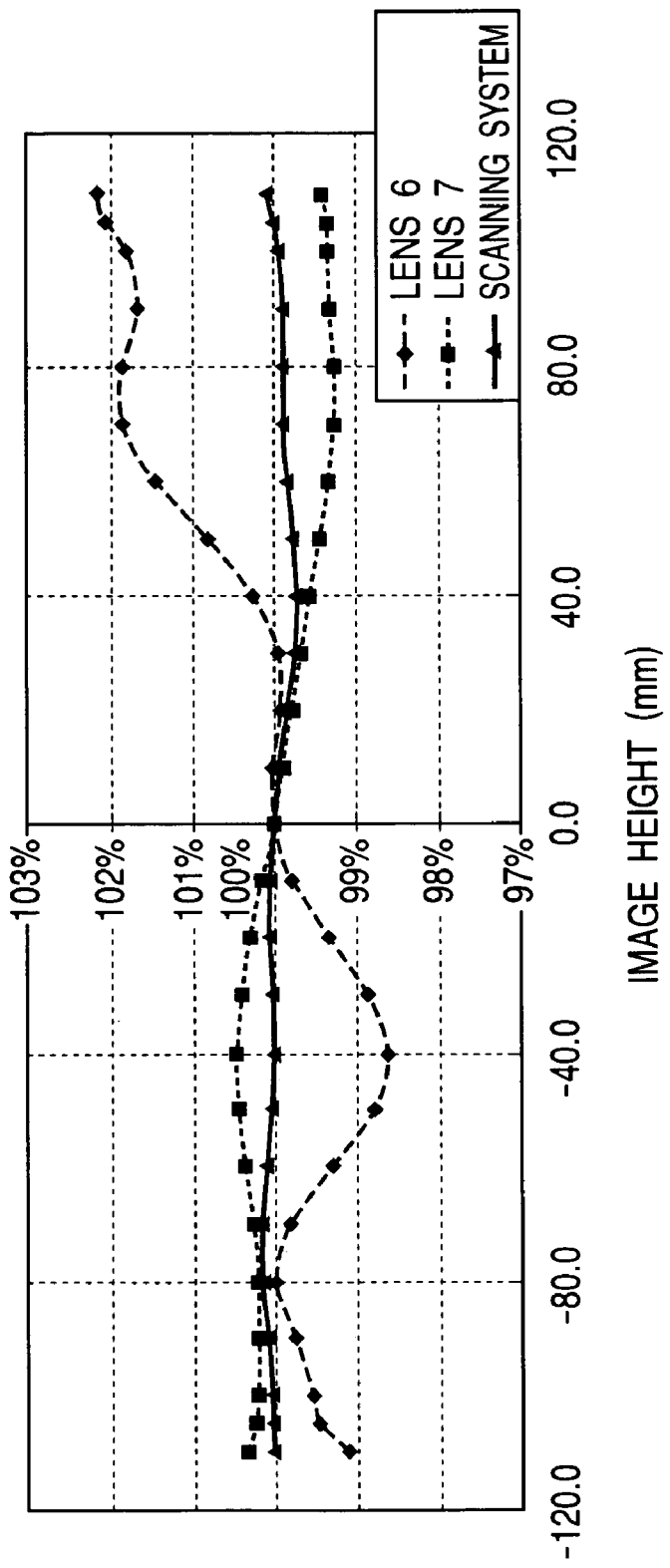
FIG. 5 shows the error of a sub-scanning imaging magnification in the first embodiment of the present invention.

Here, the result of calculating the deviation of the arrival position in the sub-scanning direction on the surface 8 to be scanned when the first scanning lens 6 and the second scanning lens 7 are parallel-shifted in the sub-scanning direction, and dividing the amount- of deviation in the sub-scanning direction at each image height by the amount of deviation on the optical axis can be graphed as shown in FIG. 5. Also, it is apparent that the aforementioned values obtained by all scanning lenses 6 and 7 being likewise parallel-shifted by the same amount at a time are the errors of the imaging magnification of-the scanning optical system 67 in the sub-scanning cross section. Consequently, these values are called the imaging magnification errors in the sub-scanning cross section of the first scanning lens 6 and the second scanning lens 7.

That is, it will be seen that to reduce the degree of sensitivity of the bending of the scanning line by the parallel shift in the sub-scanning direction, the imaging magnification errors in the sub-scanning cross section of the first scanning lens 6 and the second scanning lens 7 can be made small.

In the present embodiment, as shown in FIG. 5, the imaging magnification errors in the sub-scanning cross section are suppressed to values of 2% or less, and as previously described, a scanning optical system almost free of the occurrence of the bending of the scanning line is achieved. If this value is suppressed to 10% or less, it will be a level substantially free of any problem.

Also, the values of the imaging magnifications in the sub-scanning cross section are related to the degree of sensitivity of the bending of the scanning line. The bending of the scanning line due to the inclination of the rotary shaft of the light deflector 5 or the surface inclination of the light deflector itself becomes lower when the imaging magnification in the sub-scanning cross section is small.

That is, in the present embodiment, when the imaging magnification in the sub-scanning cross section (sub-scanning imaging magnification) of the scanning optical system 67 is defined as βs, it is preferable to satisfy the condition that $$|\beta s|<2.5 \tag{2}$$

By satisfying conditional expression (2), the degree of sensitivity of the bending of the scanning line can be substantially reduced. Incidentally, in the present embodiment, |βs|=2.0, and this satisfies conditional expression (2), to thereby achieve a scanning optical system 67 strong against the surface inclination of the light deflector 5.

More preferably, conditional expression (2) may be $$0.03<|\beta s|<2.2. \tag{2a}$$

Still more preferably, the lower limit value may be 0.01.

Also, in the present embodiment, as previously described, the shape of the first scanning lens 6 in the sub-scanning cross section is made into a biconvex shape and the shape of the second scanning lens 7 in the sub-scanning cross section is made into a positive meniscus shape having its concave surface facing the light deflector 5 side, whereby a scanning optical system in which the sub-scanning magnification error is 10% or less and the sub-scanning imaging magnification |βs| is 2.5 or less can be set easily.

Also, as a feature of the present embodiment, it is preferable that the shape of the incidence surface 7a of the second scanning lens 7 in the main scanning cross section be a gentle aspherical free of any inflection point or arcuate shape, and when the radius of curvature of the incidence surface 7a on the optical axis in the main scanning cross section is defined as R3 (mm), the condition that $$2.5<|R3/fm| \tag{3}$$

be satisfied. By satisfying conditional expression (3), the degree of sensitivity of the bending of the scanning line can be reduced. Incidentally, in the present embodiment, |R3/fm|=4.00, and this satisfies conditional expression (3).

More preferably, conditional expression (3) may be $$3.0<|R3/fm| \tag{3a}$$

Figure 6:
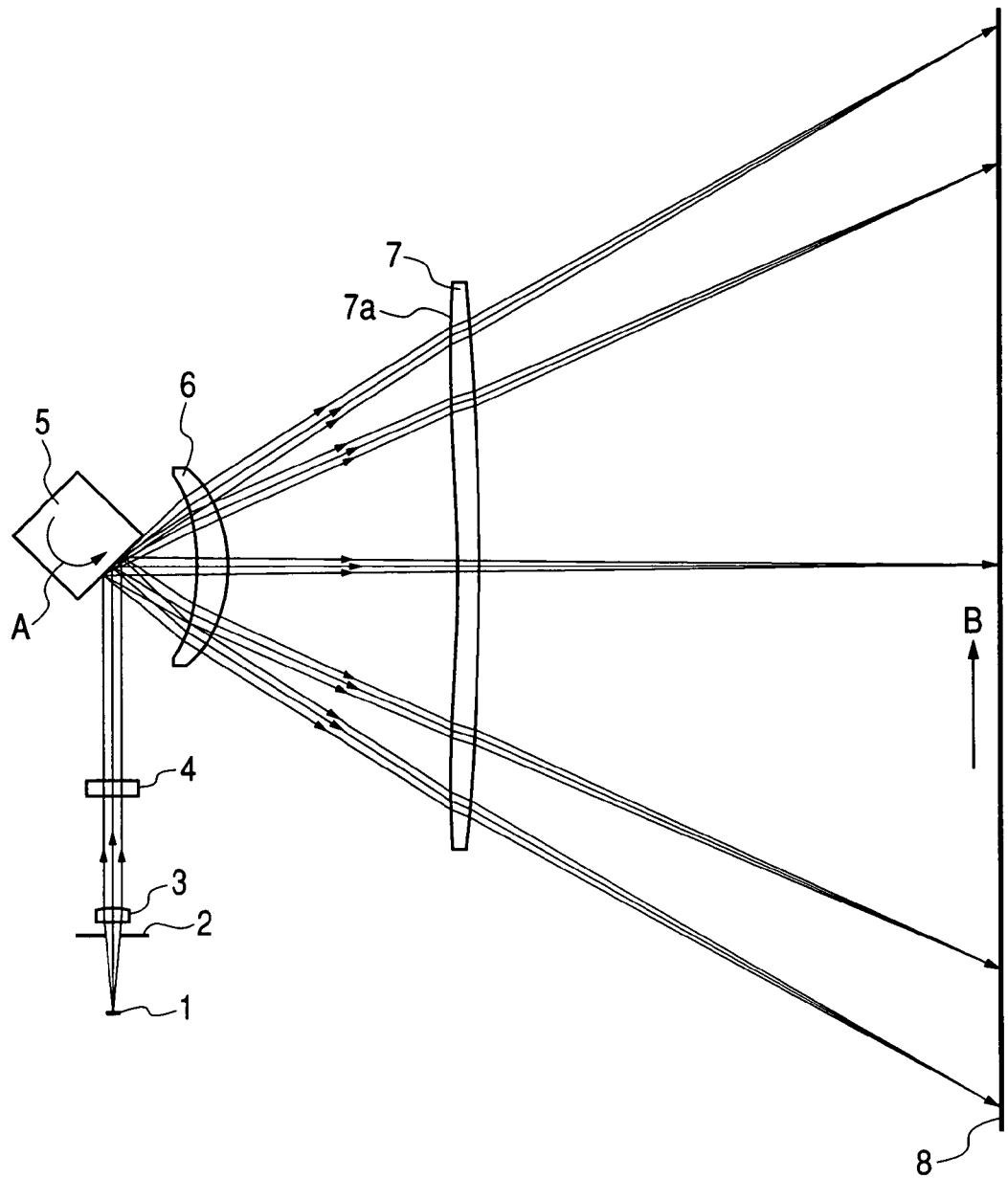
FIG. 6 is a main scanning cross-sectional view in a comparative example.
Figure 7:
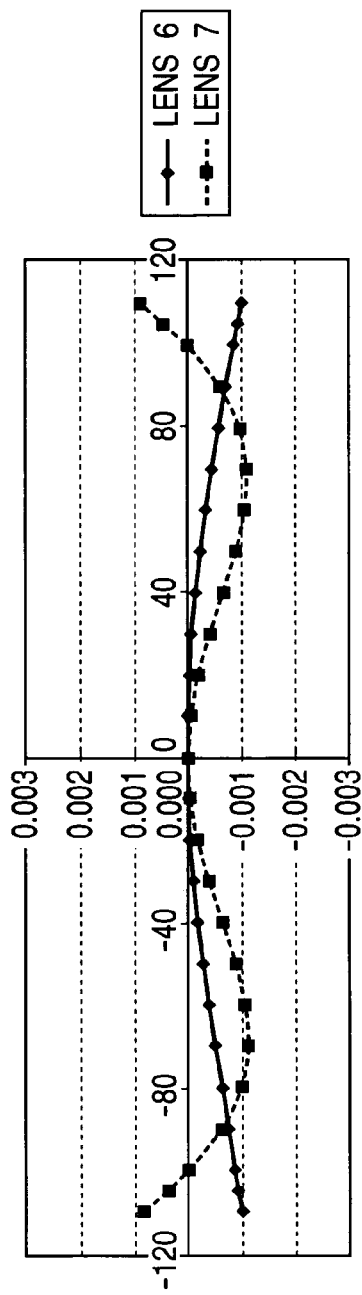
FIG. 7 shows the degree of sensitivity of the bending (inclination eccentricity) of a scanning line in the comparative example.
Figure 8:
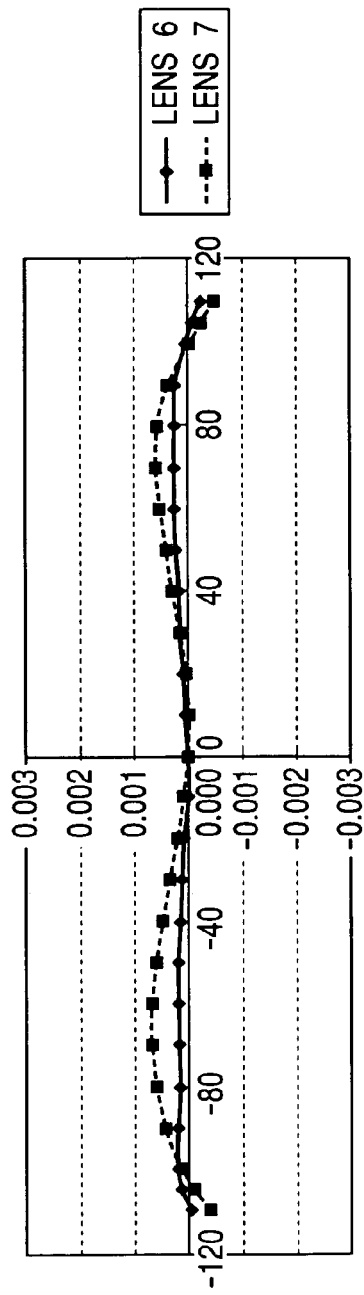
FIG. 8 shows the degree of sensitivity of the bending (parallel eccentricity) of the scanning line in the comparative example.

Here, for comparison with the present embodiment, the degree of sensitivity of the bending of the scanning line in the case of such a scanning lens in which the incidence side surface of a scanning lens (fθ lens) shown in FIG. 6 and Tables 2A, 2B and 2C below has an inflection point is shown in FIGS. 7 and 8. A point which should be particularly noted is that the bending of the scanning line due to the inclination eccentricity of the second scanning lens 7 is W-shaped.

TABLE 2A (Comparative Example)

Construction of Optical Scanning Apparatus
fθ coefficient, scanning width,
Angle of view

| fθ coefficient | k | 150 |
|---|---|---|
| | (mm/rad) | |
| scanning width | W (mm) | 214 |
| maximum angle of view | θ (deg) | 40.87 |

TABLE 2A-continued (Comparative Example)

wave length, refractive index

| | | |
|---|---|---|
| wavelength used | λ (nm) | 780 |
| refractive index of fθ lens 6 | N1 | 1.5242 |
| refractive index of fθ lens 7 | N2 | 1.5242 | arrangement of scanning optical system

| | | |
|---|---|---|
| polygon deflecting surface 5a - lens incidence surface 6a | d0 (mm) | 16.50 |
| lens incidence surface 6a - lens exit surface 6b | d1 (mm) | 6.00 |
| lens exit surface 6b - lens incidence surface 7a | d2 (mm) | 45.50 |
| lens incidence surface 7a - lens exit surface 7b | d3 (mm) | 4.00 |
| lens exit surface 7b - surface 8 to be scanned | d4 (mm) | 103.21 |
| polygon deflecting surface 5a - surface 8 to be scanned | d total | 174.71 | angle of incidence (incidence optical system)

| | | |
|---|---|---|
| Angle of incidence in main scanning direction | d (deg) | 90.00 |

TABLE 2B (Comparative Example)
Construction of Optical Scanning Apparatus

| | meridian line shape of fθ lens 6 | | | sagittal line shape of fθ lens 6 | |
|---|---|---|---|---|---|
| | incidence surface 6a counter-light source side | exit surface 6b counter-light source side | | incidence surface 6a counter-light source side | exit surface 6b counter-light source side |
| R | −3.41949E+01 | −2.39290E+01 | Rs | 8.98781E+01 | −4.00000E+01 |
| K | −2.07110E+00 | −1.55191E+00 | D2 | −2.50812E−03 | 1.50111E−03 |
| B4 | 4.49022E−06 | −3.83595E−06 | D4 | 7.96875E−07 | −3.63008E−06 |
| B6 | 1.50068E−08 | 1.34064E−08 | D6 | 0.00000E+00 | 3.32915E−08 |
| B8 | −7.93005E−11 | −5.49586E−12 | D8 | 0.00000E+00 | 0.00000E+00 |
| B10 | 3.65531E−14 | −6.54149E−14 | D10 | 0.00000E+00 | 0.00000E+00 |
| | Light source side | Light source side | | Light source side | Light source Side |
| R | −3.41949E+01 | −2.39290E+01 | Rs | 8.98781E+01 | −4.00000E+01 |
| K | −2.07110E+00 | −1.55191E+00 | D2 | −2.50812E−03 | 1.50111E−03 |
| B4 | 4.49022E−06 | −3.83595E−06 | D4 | 7.96875E−07 | −3.63008E−06 |
| B6 | 1.50068E−08 | 1.34064E−08 | D6 | 0.00000E+00 | 3.32915E−08 |
| B8 | −7.93005E−11 | −5.49586E−12 | D8 | 0.00000E+00 | 0.00000E+00 |
| B10 | 3.65531E−14 | −6.54149E−14 | D10 | 0.00000E+00 | 0.00000E+00 |

TABLE 2C (Comparative Example)
Construction of Optical Scanning Apparatus

| | meridian line shape of fθ lens 7 | | | sagittal line shape of fθ lens 7 | |
|---|---|---|---|---|---|
| | Incidence surface 7a counter-light source side | exit surface 7b counter-light source side | | incidence surface 7a counter-light source side | exit surface 7b counter-light source side |
| R | −2.01401E+02 | −6.00000E+02 | Rs | −6.64989E+01 | −1.78001E+01 |
| K | −2.38821E+00 | 0.00000E+00 | D2 | −9.37754E−05 | 9.98209E−05 |
| B4 | 1.41111E−06 | 0.00000E+00 | D4 | −1.06386E−08 | −4.18009-08 |
| B6 | −3.88529E−10 | 0.00000E+00 | D6 | 6.11269E−12 | 5.37115E−12 |
| B8 | 6.37890E−14 | 0.00000E+00 | D8 | 0.00000E+00 | 0.00000E+00 |
| B10 | −4.70592E−18 | 0.00000E+00 | D10 | 0.00000E+00 | 0.00000E+00 |
| | Light source side | Light source side | | Light source side | Light source side |
| R | −2.01401E+02 | −6.00000E+02 | Rs | −6.64989E+01 | 1.78001E+01 |
| K | −2.38821E+00 | 0.00000E+00 | D2 | −1.19873E−04 | 9.98209E−05 |
| B4 | 1.41111E−06 | 0.00000E+00 | D4 | 1.76029E−08 | −4.18009-08 |

TABLE 2C-continued (Comparative Example)
Construction of Optical Scanning Apparatus

| B6  | -3.88529E-10 | 0.00000E+00 | D6  | -6.55223E-13 | 5.37115E-12 |
| B8  | 6.37890E-14  | 0.00000E+00 | D8  | 0.00000E+00  | 0.00000E+00 |
| B10 | -4.70592E-18 | 0.00000E+00 | D10 | 0.00000E+00  | 0.00000E+00 |

When as described above, the shape of the incidence surface 7a of the second scanning lens 7 has an inflection point (W-shape), the bending of the scanning line also becomes W-shaped. The optical scanning apparatus has an adjusting mechanism such as for pushing a portion of the scanning lens in the sub-scanning direction (such as fixing the opposite ends thereof in the main scanning direction, and pushing the center thereof) to correct the bending of the scanning line), but the W-shaped bending of the scanning line is difficult to correct for the entire scanning area.

Consequently, it is desirable that as in the present embodiment, the shape of the incidence surface 7a of the second scanning lens 7 in the main scanning cross section be a gentle aspherical or arcuate shape.

As described above, in the present embodiment, there can be provided an optical scanning apparatus in which it is difficult for the bending of the scanning line to occur even when the first scanning lens 6 and the second scanning lens 7 are shifted or inclined in the sub-scanning direction due to the manufacturing error, the assembling error or the like as described above, and a reduction in cost by the simplification or disuse of the adjustment of the bending of the scanning line can be expected.

(Second Embodiment)

Figure 9:
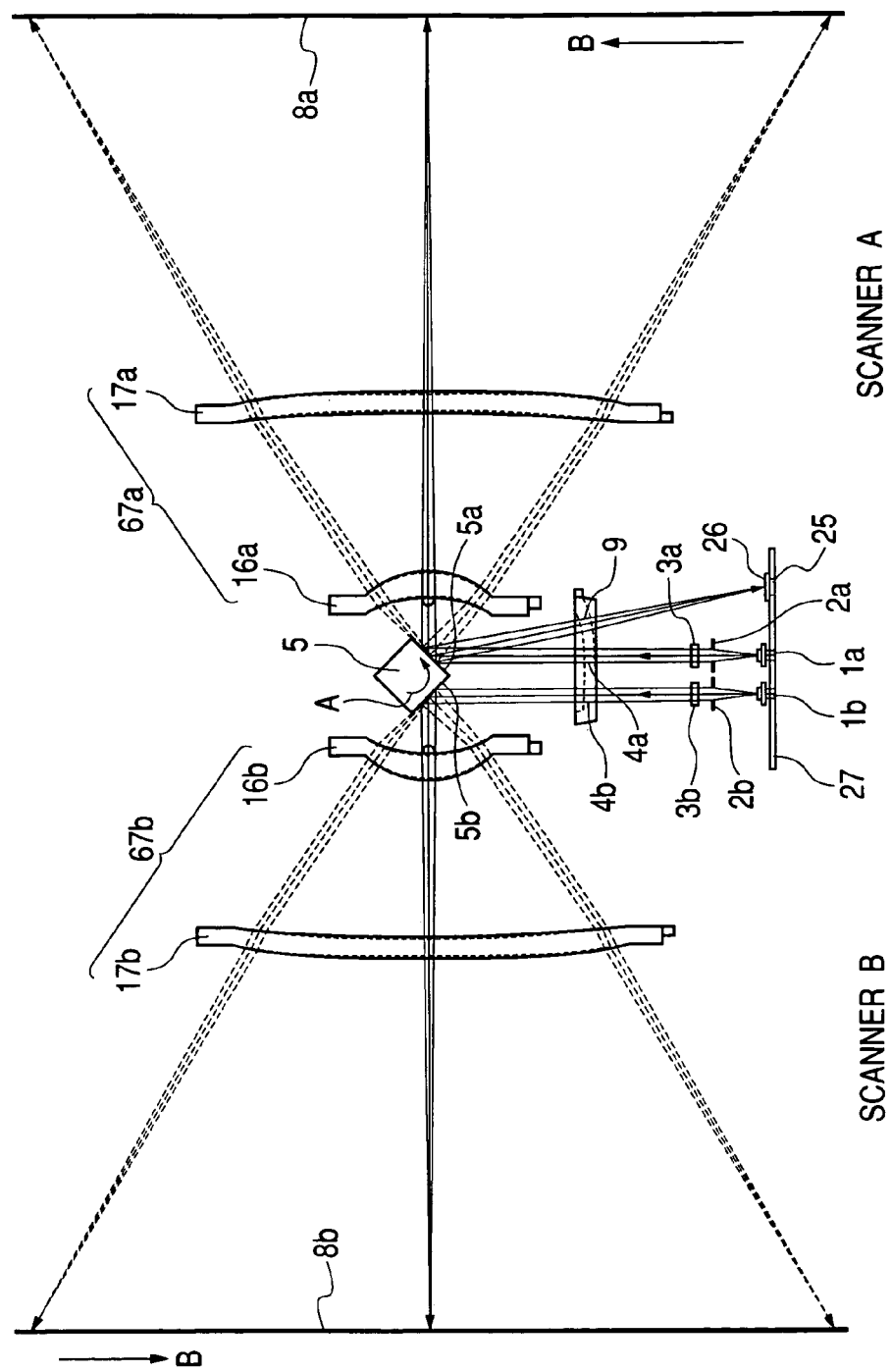
FIG. 9 is a sub-scanning cross-sectional view showing an embodiment of the image forming apparatus of the present invention.

FIG. 9 is a cross-sectional view (main scanning cross-sectional view) of the essential portions of a second embodiment of the optical scanning apparatus of the present invention in the main scanning direction.

The difference of the present embodiment from the afore-described first embodiment is that the present invention is applied to a tandem type optical scanning apparatus in which beams emitted from two light source means 1a and 1b scan on two surfaces 8a and 8b to be scanned at a time through a single light deflector 5. In the other points, the construction and optical action of the present embodiment are substantially similar to those of the first embodiment, whereby a similar effect is obtained.

That is, in the present embodiment, the optical scanning apparatus has scanners A and B disposed symmetrically with respect to the polygon mirror 5. Also, in the present embodiment, the two beams emitted from the two light source means 1a and 1b are reflected and deflected at a time by the adjacent deflecting surfaces 5a and 5b of the polygon mirror (light deflector) 5 having four deflecting surfaces through stops 2a, 2b, collimator lenses 3a, 3b and cylindrical lenses 4a, 4b, and are imaged on the surfaces 8a and 8b of discrete photosensitive drums through scanning optical systems 67a and 67b, respectively, shown in the first embodiment.

Also, in FIG. 9, the reference numeral 9 designates a writing start position detecting lens (BD lens) which condenses a beam for writing start timing (BD beam). The reference numeral 25 denotes writing start position detecting means (BD sensor) which obtains a synchronizing signal for determining a scanning start position in a lengthwise direction. The reference numeral 26 designates a synchronism detecting stop, and the reference numeral 27 denotes an electric substrate on which the light source means 1a, 1b and the BD sensor 25 are disposed.

In FIG. 9, the beams incident from the light source means 1a and 1b onto the deflecting surfaces 5a and 5b are incident at an angle of 90° with respect to the optical axes of the corresponding scanning optical systems 67a and 67b.

(Color Image Forming Apparatus)

Figure 10:
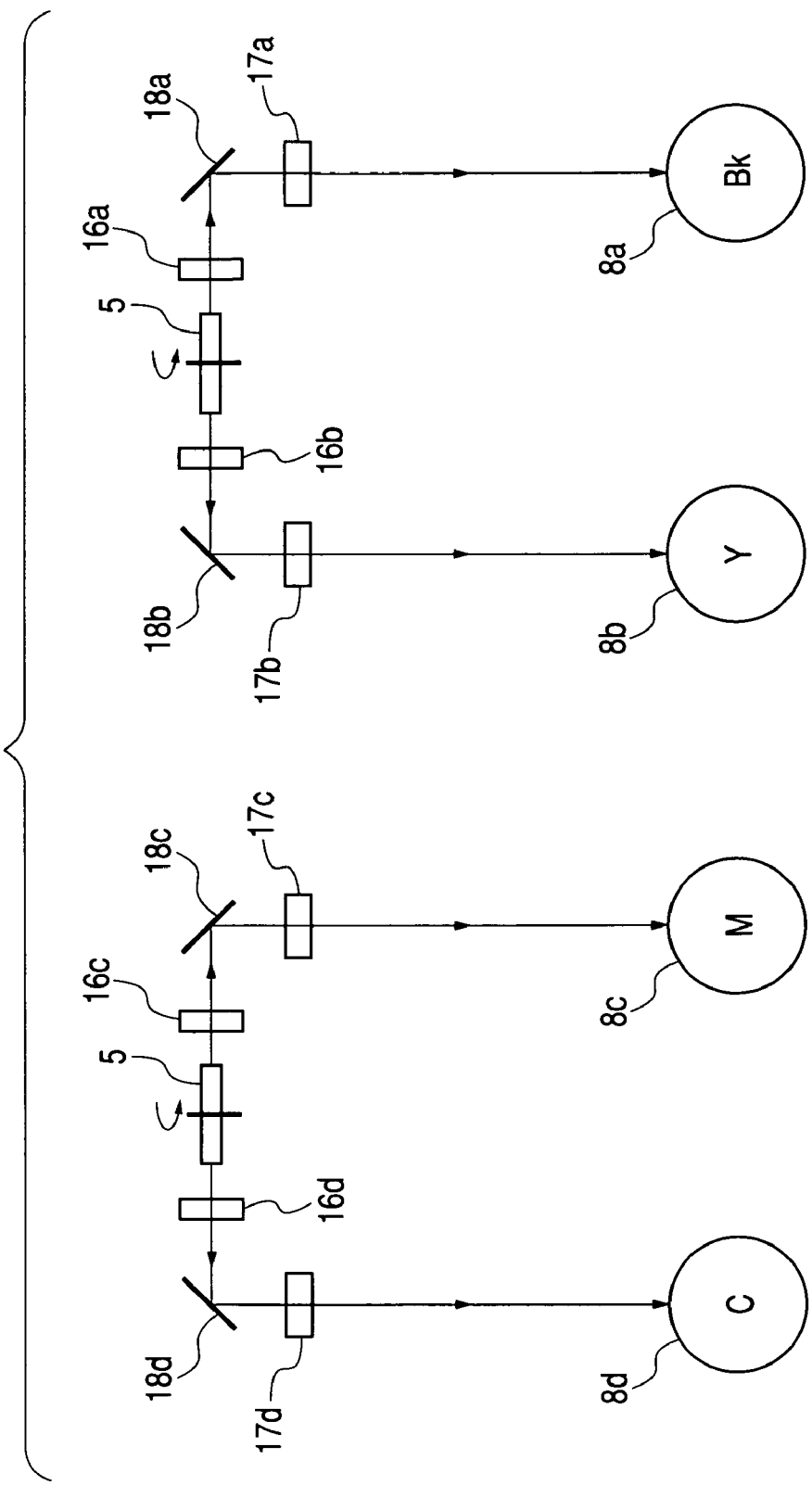
FIG. 10 is a schematic view of the essential portions of the color image forming apparatus of the present invention.

FIG. 10 is a schematic view of the essential portions of a color image forming apparatus in which the optical scanning apparatus shown in FIG. 9 is disposed in parallel in two sets, and four scanning lines in total are depicted by two light deflectors.

In FIG. 10, four beams after reflected and deflected by the polygon mirrors (light deflectors) 5, 5 and passed through first scanning lenses 16a, 16b, 16c, 16d are bent downwardly by 90° in FIG. 10 by turn-back mirrors 18a, 18b, 18c, 18d, and are directed onto the surfaces 8a, 8b, 8c, 8d of the corresponding drums through second scanning lenses 17a, 17b, 17c, 17d.

By scanning a plurality of beams by a single polygon mirror as described above, it is possible to eliminate a polygon mirror heretofore required per beam, thereby achieving the simplification of the entire color image forming apparatus.

(Image Forming Apparatus)

Figure 11:
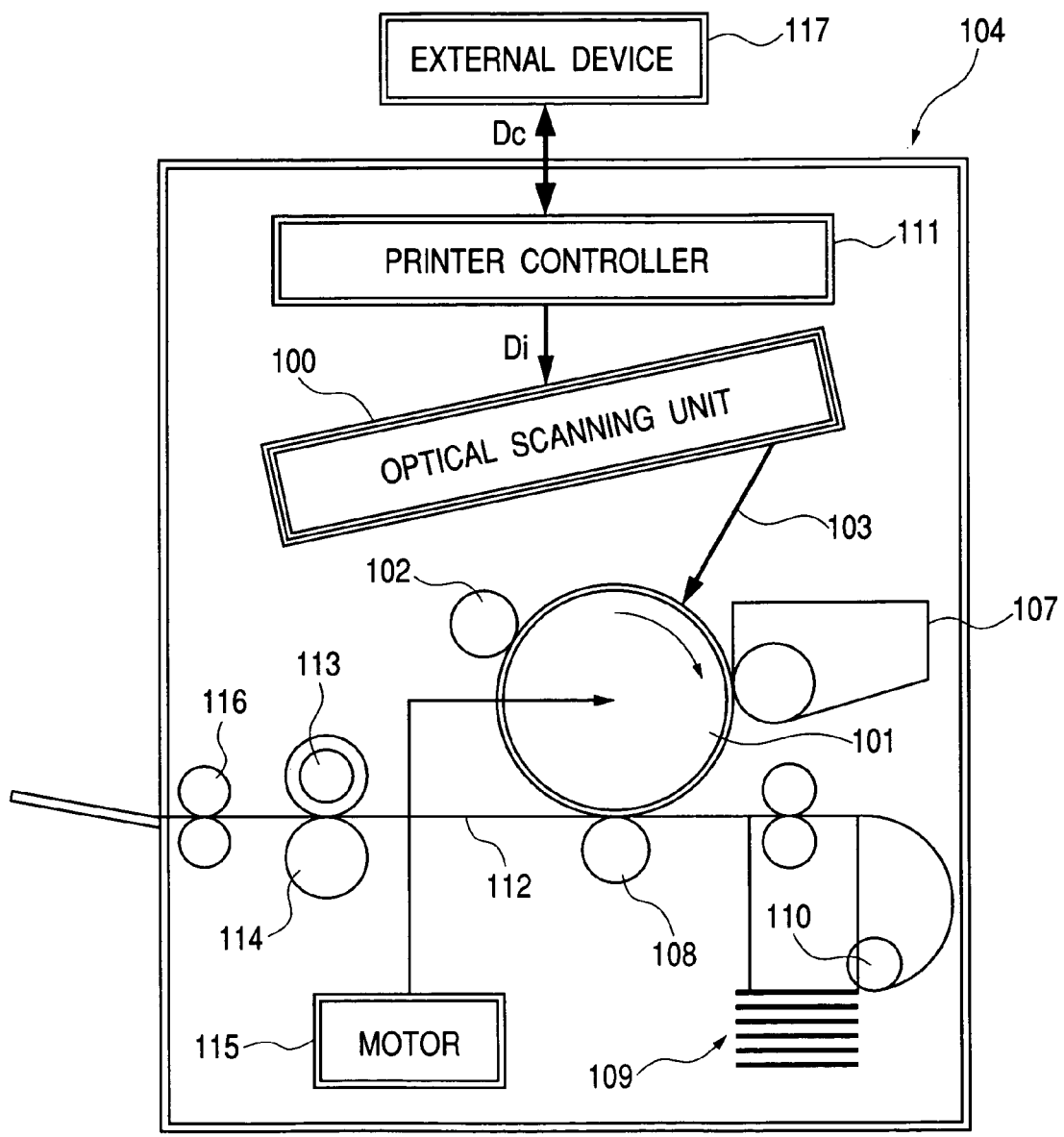
FIG. 11 is a main scanning cross-sectional view showing an embodiment of the present invention.

FIG. 11 is a cross-sectional view of essential portions in the sub-scanning direction showing an embodiment of the image forming apparatus of the present invention. In FIG. 11, the reference numeral 104 designates the image forming apparatus. Code data Dc is inputted from an external device 117 such as a personal computer to the image forming apparatus 104. This code data Dc is converted into image data (dot data) Di by a printer controller 111 in the image forming apparatus. The image data Di is inputted to an optical scanning unit 100 having the construction shown in the first embodiment. A light beam 103 modulated in conformity with the image data Di is emitted from the optical scanning unit 100, and the photosensitive surface of a photosensitive drum 101 is scanned in the main scanning direction by the light beam 103.

The photosensitive drum 101 which is an electrostatic latent image bearing member (photosensitive member) is clockwisely rotated by a motor 115. With this rotation, the photosensitive surface of the photosensitive drum 101 is moved relative to the light beam 103 in the sub-scanning direction orthogonal to the main scanning direction. Above the photosensitive drum 101, a charging roller 102 for uniformly charging the surface of the photosensitive drum 101 is provided so as to contact with the surface of the photosensitive drum. The light beam 103 scanned by the optical scanning unit 100 is applied to the surface of the photosensitive drum 101 charged by the charging roller 102.

As previously described, the light beam 103 is modulated on the basis of the image data Di, and this light beam 103 is applied to the surface of the photosensitive drum 101 to thereby form an electrostatic latent image thereon. This electrostatic latent image is developed as a toner image by a developing device 107 disposed so as to contact with the photosensitive drum 101 on the downstream side of the applied position of the light beam 103 with respect to the direction of rotation of the photosensitive drum 101.

The toner image developed by the developing device 107 is transferred onto paper 112 which is a transferring material by a transferring roller 108 disposed below the photosensitive drum 101 so as to be opposed to the photosensitive drum 101. The paper 112 is contained in a paper cassette 109 disposed forwardly (on the right as viewed in FIG. 11) of the photosensitive drum 101, and can also be manually fed. On an end portion of the paper cassette 109, there is disposed a paper feeding roller 110, which feeds the paper 112 in the paper cassette 109 to a transporting path.

The paper 112 to which the unfixed toner image has been transferred in the manner described above is further transported to a fixing device disposed rearwardly (on the left as viewed in FIG. 11) of the photosensitive drum 101. The fixing device is comprised of a fixing roller 113 having a fixing heater (not shown) therein, and a pressure roller 114 disposed so as to be brought into pressure contact with the fixing roller 113, and pressurizes and heat the paper 112 transported from a transferring portion by the pressure contact portion between the fixing roller 113 and the pressure roller 114 to thereby fix the unfixed toner image on the paper 112. Delivery rollers 116 are disposed rearwardly of the fixing roller 113 and deliver the paper 112 having had the toner image thereon fixed to the outside of the image forming apparatus.

Although not shown in FIG. 11, the printer controller 111 effects not only the convection of the aforedescribed data, but also the control of various portions in the image forming apparatus including the motor 115, and a polygon motor or the like in the optical scanning unit which will be described later.

(Color Image Forming Apparatus)

Figure 12:
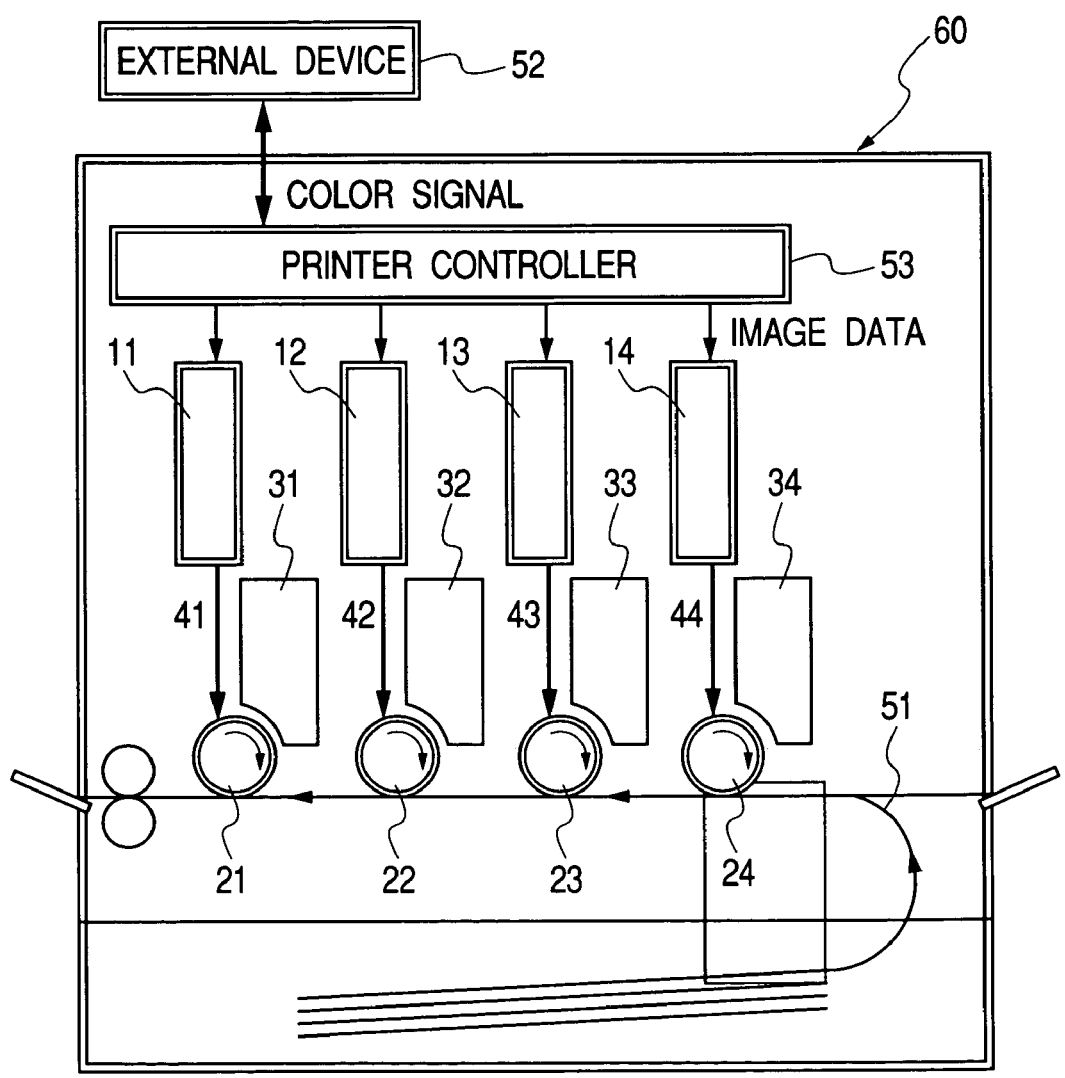
FIG. 12 is a sub-scanning cross-sectional view showing the embodiment of the image forming apparatus of the present invention.
Figure 13:
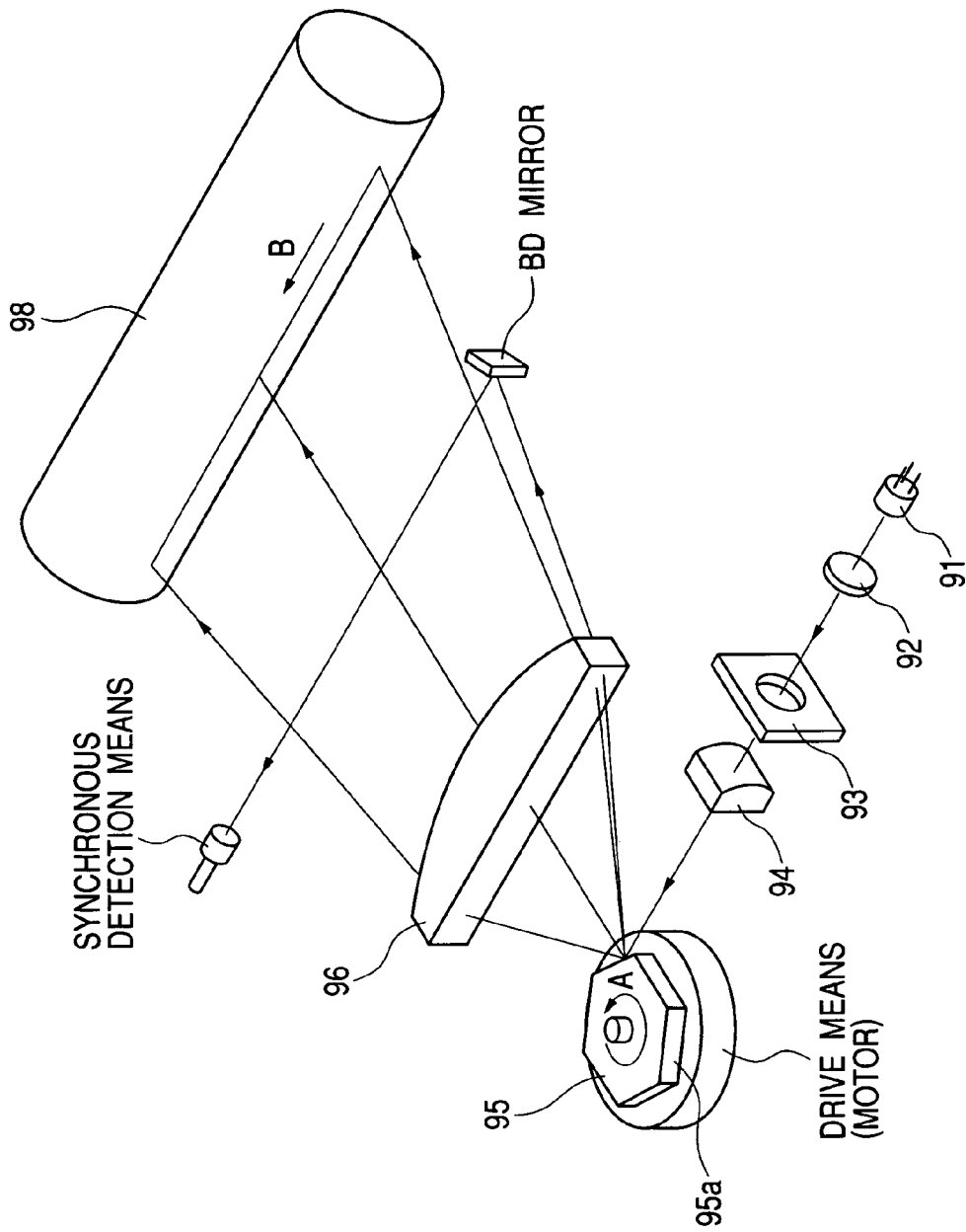
FIG. 13 is a perspective view of the essential portions of a conventional optical scanning apparatus.
Figure 14:
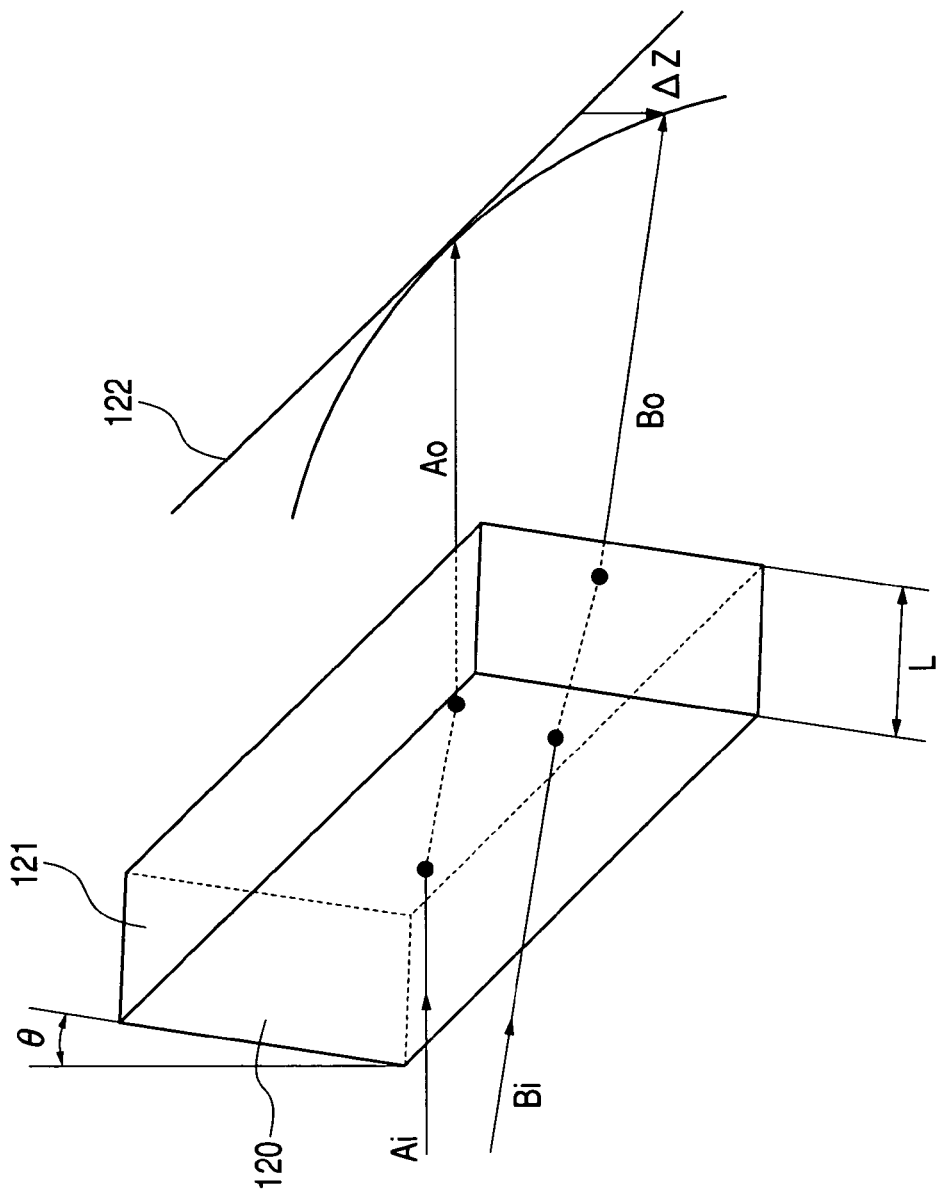
FIG. 14 illustrates the occurrence of the bending of a scanning line caused by the inclination of an optical part.
Figure 15:
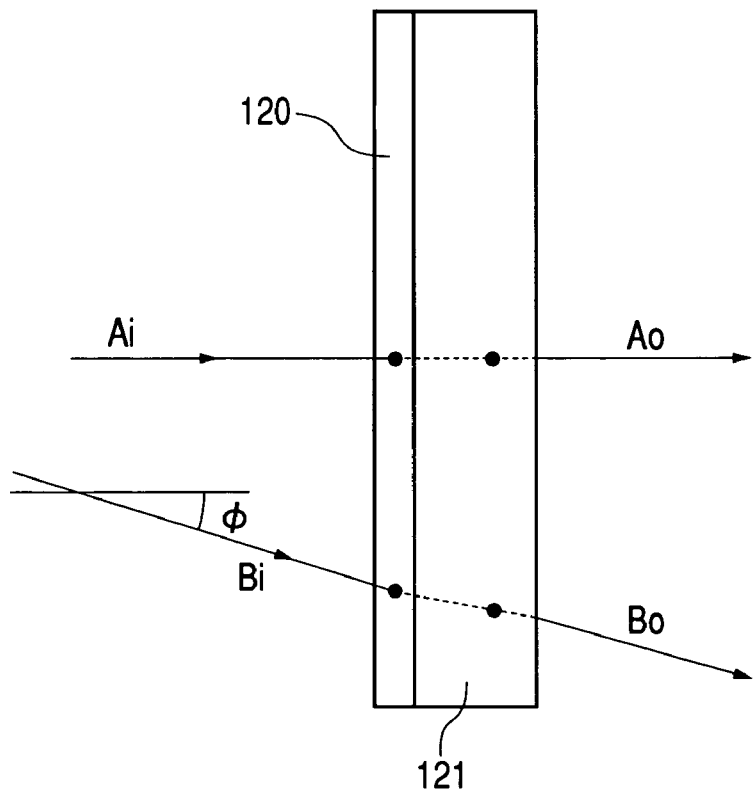
FIG. 15 illustrates the occurrence of the bending of the scanning line caused by the inclination of the optical part.
Figure 16:
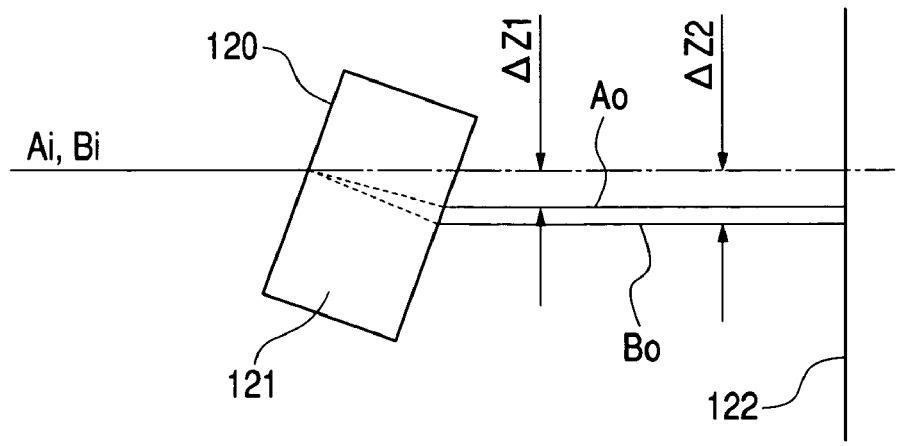
FIG. 16 illustrates the occurrence of the bending of the scanning line caused by the inclination of the optical part.

FIG. 12 is a schematic view of the essential portions of the color image forming apparatus of the present invention. This embodiment is a tandem type color image forming apparatus in which four optical scanning apparatuses are juxtaposed and image information is recorded in parallel on the surfaces of photosensitive drums which are image bearing members. In FIG. 12, the reference numeral 60 designates the color image forming apparatus, the reference numerals 11, 12, 13 and 14 denote optical scanning apparatuses each having the construction shown in the first embodiment, the reference numerals 21, 22, 23 and 24 designate photosensitive drums as image bearing members, the reference numerals 31, 32, 33 and 34 denote developing devices, and the reference numeral 51 designates a transporting belt.

In FIG. 12, R (red), G (green) and B (blue) color signals are inputted from an external device 52 such as a personal computer to the color image forming apparatus 60. These color signals are converted into C (cyan), M (magenta), Y (yellow) and Bk (black) image data by a printer controller 53 in the color image forming apparatus. These image data are inputted to the optical scanning apparatuses 11, 12, 13 and 14, respectively. Light beams 41, 42, 43 and 44 modulated in conformity with the respective image data are emitted from these optical scanning apparatuses, and the photosensitive surfaces of the photosensitive drums 21, 22, 23 and 24 are scanned in the main scanning direction by these light beams.

In this color image forming apparatus, four optical scanning apparatuses (11, 12, 13 and 14) are juxtaposed and they correspond to the respective colors C (cyan), M (magenta), Y (yellow) and Bk (black), and image signals (image information) are recorded in parallel on the surfaces of the photosensitive drums 21, 22, 23 and 24 to thereby print a color image at a high speed.

This color image forming apparatus, as described above, forms latent images of respective colors on the surfaces of the corresponding photosensitive drums 21, 22, 23 and 24 by the four optical scanning apparatuses 11, 12, 13 and 14 by the use of light beams based on the respective image data. Thereafter, the latent images are developed as toner images, which are superimposed and transferred onto a recording material to thereby form a full-color image. As the external device 52, use may be made, for example, of a color image reading apparatus provided with a CCD sensor. In this case, a color digital copying machine is constituted by this color image reading apparatus and the color image forming apparatus 60.

While various examples and embodiments of the present invention have been shown and described, those skilled in the art would understand that the gist and scope of the present invention are not restricted to the particular description and figures herein, but extend to various modifications and changes all described in the appended claims.

According to the present invention, as previously described, there can be achieved an optical scanning apparatus in which the shapes of scanning lenses constituting a scanning optical system are appropriately set, whereby the degree of sensitivity of the bending of a scanning line on a surface to be scanned resulting from the disposition error of the scanning optical system can be reduced and the simplification of a mechanism for adjusting the bending of the scanning line can be achieved and good images can always be obtained, and an image forming apparatus using the same.

Also, there can be achieved a color image forming apparatus using a plurality of optical scanning apparatus described above, wherein a good color image free of color misregister can be obtained.

What is claimed is:

1. An optical scanning apparatus provided with:
   light source means;
   deflecting means for deflecting a beam emitted from said light source means; and
   a scanning optical system having a plurality of scanning lenses for directing the beam deflected by said deflecting means onto a surface to be scanned;
   wherein of said plurality of scanning lenses, a first scanning lens nearest to the deflecting means is such that the shape thereof in a main scanning cross section is a meniscus shape having positive refractive power, and satisfies a condition that $d1/fm < 0.06$, where fm is a focal length of said scanning optical system in the main scanning cross section, and d1 is a central thickness of the first scanning lens, and a second scanning lens nearest to the surface to be scanned is such that in the main scanning cross section, the shape of a light incidence side surface thereof is an aspherical shape free of an inflection point or an arcuate shape, and satisfies a condition that $2.5 < |R3/fm|$, where R3 is a radius of curvature of said light incidence side surface on an optical axis thereof in the main scanning cross section, and wherein the first scanning lens is such that in a sub-scanning cross section, both surfaces thereof are of a convex shape.

2. An optical scanning apparatus according to claim 1, which satisfies a condition that $$|\beta s|<2.5,$$

where βs is an imaging magnification of said scanning optical system in a sub-scanning cross section.

3. An optical scanning apparatus according to claim 1, wherein the second scanning lens is of a meniscus shape having its concave surface facing said deflecting means side in a sub-scanning cross section and having positive refractive power.

4. An optical scanning apparatus provided with:
light source means;
deflecting means for deflecting a beam emitted from said light source means; and
a scanning optical system having a plurality of scanning lenses for directing the beam deflected by said deflecting means onto a surface to be scanned;
wherein of said plurality of scanning lenses, a first scanning lens nearest to the deflecting means is such that the shape thereof in a main scanning cross section is a meniscus shape having positive refractive power, and satisfies a condition that $$d1/fm<0.06,$$

where fm is a focal length of said scanning optical system in the main scanning cross section, and d1 is a central thickness of the first scanning lens, and a second scanning lens nearest to the surface to be scanned is such that in the main scanning cross section, the shape of a light incidence side surface thereof is an aspherical shape free of an inflection point or an arcuate shape, and satisfies a condition that $$2.5<|R3/fm|,$$

where R3 is a radius of curvature of said light incidence side surface on an optical axis thereof in the main scanning cross section, and
wherein the imaging magnification errors of said scanning optical system in a sub-scanning cross section are 10% or less.

5. An optical scanning apparatus provided with:
light source means;
deflecting means for deflecting a beam emitted from said light source means; and
a scanning optical system for directing the beam deflected by said deflecting means onto a surface to be scanned;
wherein said scanning optical system consists of two scanning lenses, and
wherein of said two scanning lenses, a first scanning lens nearer to the deflecting means is such that the shape thereof in the main scanning cross section is a meniscus shape having positive refractive power, and satisfies a condition that $$d1/fm<0.06,$$

wherein fm is a focal length of said scanning optical system in the main scanning cross section, and d1 is a central thickness of the first scanning lens, and a second scanning lens nearer to the surface to be scanned is such that in the main scanning cross section, the shape of a light incidence side surface thereof is an aspherical shape free of an inflection point or an arcuate shape, and satisfies a condition that $$2.5<|R3/fm|,$$

where R3 is a radius of curvature of said light incidence side surface on an optical axis thereof in the main scanning cross section.

6. An image forming apparatus having an optical scanning apparatus according to any one of claims 1 or 2 to 5, a photosensitive member disposed on said surface to be scanned, a developing device for developing as a toner image an electrostatic latent image formed on said photosensitive member by a light beam scanned by said optical scanning apparatus, a transferring device for transferring the developed toner image to a transferring material, and a fixing device for fixing the transferred toner image on the transferring material.

7. An optical scanning apparatus according to claim 4, which satisfies a condition that $$|\beta s|<2.5,$$

where βs is an imaging magnification of said scanning optical system in a sub-scanning cross section.

8. An optical scanning apparatus according to claim 4, wherein the second scanning lens is of a meniscus shape having its concave surface facing said deflecting means side in a sub-scanning cross section and having positive refractive power.

9. An optical scanning apparatus according to claim 5, which satisfies the condition that $$|\beta s|<2.5,$$

where βs is an imaging magnification of said scanning optical system in a sub-scanning cross section.

10. An optical scanning apparatus according to claim 5, wherein the second scanning lens is of a meniscus shape having its concave surface facing said deflecting means side in a sub-scanning cross section and having positive refractive power.

11. An image forming apparatus having an optical scanning apparatus according to any one of claims 1, 4, 5, 7 or 8, and a printer controller for converting code data inputted from an external device into an image signal and inputting it to said optical scanning apparatus.

12. A color image forming apparatus having a plurality of image bearing members disposed on the surface to be scanned of an optical scanning apparatus according to any one of claims 1, 4, 5, 9 or 10 for forming images of different colors.

13. A color image forming apparatus according to claim 12, further having a printer controller for converting a color signal inputted from an external device into image data of different colors and inputting the image data to respective optical Scanning apparatuses.

* * * * *

UNITED STATES PATENT AND TRADEMARK OFFICE
CERTIFICATE OF CORRECTION

PATENT NO. : 6,992,807 B2
APPLICATION NO. : 10/725399
DATED : January 31, 2006
INVENTOR(S) : Hidekazu Shimomura It is certified that error appears in the above-identified patent and that said Letters Patent is hereby corrected as shown below:

COLUMN 4
Line 49, "deflectors" should read --deflector 5--.

COLUMN 7
Line 67, "+ $D10Y^{10}$)," should read --+ $D10 \times Y^{10}$),--.

COLUMN 9
Line 43, "amount-" should read --amount--; and
Line 49, "of-the" should read --of the--.

Signed and Sealed this

Twenty-second Day of August, 2006

JON W. DUDAS
*Director of the United States Patent and Trademark Office*